US009558609B2

(12) United States Patent
Marks et al.

(10) Patent No.: US 9,558,609 B2
(45) Date of Patent: *Jan. 31, 2017

(54) GAMING SYSTEM AND METHOD HAVING A PARTIAL SELECTABLE SYMBOL MATRIX

(71) Applicant: IGT, Las Vegas, NV (US)

(72) Inventors: Daniel M. Marks, Decatur, GA (US); Anthony M. Singer, Saddle River, NJ (US); Howard M. Marks, Decatur, GA (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/936,232

(22) Filed: Nov. 9, 2015

(65) Prior Publication Data

US 2016/0063805 A1 Mar. 3, 2016

Related U.S. Application Data

(63) Continuation of application No. 13/536,412, filed on Jun. 28, 2012, now Pat. No. 9,286,746, which is a (Continued)

(51) Int. Cl.
*G06F 17/00* (2006.01)
*G06F 19/00* (2011.01)
(Continued)

(52) U.S. Cl.
CPC ........... *G07F 17/32* (2013.01); *G07F 17/3213* (2013.01); *G07F 17/3262* (2013.01); *G07F 17/34* (2013.01)

(58) Field of Classification Search
CPC .... G07F 17/32; G07F 17/326; G07F 17/3262; G07F 17/3265; G07F 17/3286
See application file for complete search history.

(56) References Cited

U.S. PATENT DOCUMENTS 3,834,712 A 9/1974 Cox
4,184,683 A 1/1980 Hooker
(Continued)

FOREIGN PATENT DOCUMENTS

AU A 50327/96 10/1997
AU A 63553/98 10/1998
(Continued)

OTHER PUBLICATIONS

Slot Machines Article written by Reno-Tahoe Specialty, Inc. published in 1989.

(Continued)

*Primary Examiner* — Milap Shah
(74) *Attorney, Agent, or Firm* — Neal, Gerber & Eisenberg LLP

(57) ABSTRACT

A gaming device including a plurality of symbol generators adapted to generate a plurality of symbols at a plurality of symbol positions. In one embodiment, a player selects a first symbol position, the selected symbol position is activated and the gaming device reveals whether a terminator is associated with the selected symbol position. In this embodiment, the player continues selecting symbol positions (and the gaming device continues activating the selected symbol positions) until a terminator is revealed to be associated with a selected symbol position. After a terminator is revealed, the gaming device randomly generating a symbol at each of the activated symbol positions. The gaming device determines an outcome based on the symbols or combinations of symbols generated at the activated symbol positions and provides the player the determined outcome.

20 Claims, 10 Drawing Sheets

Related U.S. Application Data continuation of application No. 11/045,895, filed on Jan. 27, 2005, now Pat. No. 8,221,206.

(60) Provisional application No. 60/539,607, filed on Jan. 28, 2004.

(51) Int. Cl.
*G07F 17/32* (2006.01)
*G07F 17/34* (2006.01)

(56) References Cited

U.S. PATENT DOCUMENTS

| | | | |
|---|---|---|---|
| 4,198,052 | A | 4/1980 | Gauselmann |
| 4,448,419 | A | 5/1984 | Telnaes |
| 4,582,324 | A | 4/1986 | Koza et al. |
| 4,624,459 | A | 11/1986 | Kaufman |
| 4,648,600 | A | 3/1987 | Olliges |
| 4,669,731 | A | 6/1987 | Clarke |
| 4,695,053 | A | 9/1987 | Vazquez, Jr. et al. |
| 4,826,169 | A | 5/1989 | Bessho et al. |
| 4,838,552 | A | 6/1989 | Hagiwara |
| 4,874,173 | A | 10/1989 | Kishishita |
| 4,991,848 | A | 2/1991 | Greenwood et al. |
| 5,085,436 | A | 2/1992 | Bennett |
| 5,102,134 | A | 4/1992 | Smyth |
| 5,102,137 | A | 4/1992 | Ekiert |
| 5,116,055 | A | 5/1992 | Tracy |
| 5,163,131 | A | 11/1992 | Row et al. |
| 5,178,390 | A | 1/1993 | Okada |
| 5,205,555 | A | 4/1993 | Hamano |
| 5,209,479 | A | 5/1993 | Nagao et al. |
| 5,265,877 | A | 11/1993 | Boylan et al. |
| 5,277,424 | A | 1/1994 | Wilms |
| 5,342,047 | A | 8/1994 | Heidel et al. |
| 5,344,144 | A | 9/1994 | Canon |
| 5,393,061 | A | 2/1995 | Manship et al. |
| 5,397,125 | A | 3/1995 | Adams |
| 5,401,024 | A | 3/1995 | Simunek |
| 5,437,451 | A | 8/1995 | Fulton |
| 5,449,173 | A | 9/1995 | Thomas et al. |
| 5,456,465 | A | 10/1995 | Durham |
| 5,472,196 | A | 12/1995 | Rusnak |
| 5,511,781 | A | 4/1996 | Wood et al. |
| 5,560,603 | A | 10/1996 | Seelig et al. |
| 5,569,084 | A | 10/1996 | Nicastro et al. |
| 5,580,053 | A | 12/1996 | Crouch |
| 5,584,764 | A | 12/1996 | Inoue |
| 5,609,524 | A | 3/1997 | Inoue |
| 5,611,535 | A | 3/1997 | Tiberio |
| 5,645,485 | A | 7/1997 | Clapper, Jr. |
| 5,647,798 | A | 7/1997 | Falciglia |
| 5,695,402 | A | 12/1997 | Stupak |
| 5,697,843 | A | 12/1997 | Manship et al. |
| 5,704,835 | A | 1/1998 | Dietz, II |
| 5,711,525 | A | 1/1998 | Breeding |
| 5,722,891 | A | 3/1998 | Inoue |
| 5,732,948 | A | 3/1998 | Yoseloff |
| 5,743,799 | A | 4/1998 | Houriet et al. |
| 5,766,074 | A | 6/1998 | Cannon et al. |
| 5,769,716 | A | 6/1998 | Saffari et al. |
| 5,779,544 | A | 7/1998 | Seelig et al. |
| 5,779,549 | A | 7/1998 | Walker et al. |
| 5,788,573 | A | 8/1998 | Baerlocher et al. |
| 5,807,172 | A | 9/1998 | Piechowiak |
| 5,817,172 | A | 10/1998 | Yamada et al. |
| 5,823,874 | A | 10/1998 | Adams |
| 5,833,537 | A | 11/1998 | Barrie |
| 5,848,932 | A | 12/1998 | Adams |
| 5,851,010 | A | 12/1998 | Feinberg |
| 5,851,148 | A | 12/1998 | Brune et al. |
| 5,855,514 | A | 1/1999 | Kamille |
| 5,882,261 | A | 3/1999 | Adams |
| 5,885,158 | A | 3/1999 | Torango et al. |
| 5,910,048 | A | 6/1999 | Feinberg |
| 5,911,418 | A | 6/1999 | Adams |
| 5,919,088 | A | 7/1999 | Weiss |
| 5,947,820 | A | 9/1999 | Morro et al. |
| 5,954,335 | A | 9/1999 | Moody |
| 5,967,893 | A | 10/1999 | Lawrence et al. |
| 5,971,849 | A | 10/1999 | Falciglia |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,993,316 | A | 11/1999 | Coyle et al. |
| 5,997,400 | A | 12/1999 | Seelig et al. |
| 5,997,401 | A | 12/1999 | Crawford |
| 6,004,207 | A | 12/1999 | Wilson, Jr. et al. |
| 6,012,982 | A | 1/2000 | Piechowialt et al. |
| 6,012,983 | A | 1/2000 | Walker et al. |
| 6,015,344 | A | 1/2000 | Kelly et al. |
| 6,015,346 | A | 1/2000 | Bennett |
| 6,045,129 | A | 4/2000 | Cooper |
| 6,050,895 | A | 4/2000 | Luciano |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,400 | A | 8/2000 | Scott et al. |
| 6,102,798 | A | 8/2000 | Bennett |
| 6,110,041 | A | 8/2000 | Walker et al. |
| 6,113,098 | A | 9/2000 | Adams |
| 6,120,378 | A | 9/2000 | Moody et al. |
| 6,126,542 | A | 10/2000 | Fier |
| 6,129,632 | A | 10/2000 | Luciano |
| 6,142,873 | A | 11/2000 | Weiss et al. |
| 6,142,874 | A | 11/2000 | Kodachi et al. |
| 6,149,156 | A | 11/2000 | Feola |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,174,233 | B1 | 1/2001 | Sunaga et al. |
| 6,174,235 | B1 | 1/2001 | Walker et al. |
| 6,186,894 | B1 * | 2/2001 | Mayeroff ................ G07F 17/32 273/138.1 |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,277 | B1 | 4/2001 | Stefan |
| 6,213,877 | B1 | 4/2001 | Walker et al. |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,241,607 | B1 | 6/2001 | Payne et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,261,128 | B1 | 7/2001 | Heim et al. |
| 6,261,177 | B1 | 7/2001 | Bennett |
| 6,261,178 | B1 | 7/2001 | Bennett |
| 6,270,409 | B1 | 8/2001 | Shuster |
| 6,270,412 | B1 | 8/2001 | Crawford et al. |
| 6,290,600 | B1 | 9/2001 | Glasson |

(56) References Cited

U.S. PATENT DOCUMENTS 6,293,866 B1 9/2001 Walker et al.
6,299,165 B1 10/2001 Nagano
6,302,790 B1 10/2001 Brossard
6,302,791 B1 10/2001 Frohm et al.
6,309,299 B1 10/2001 Weiss
6,309,300 B1 10/2001 Glavich
6,311,976 B1 11/2001 Yoseloff et al.
6,312,331 B1 11/2001 Tamaki
6,312,334 B1 11/2001 Yoseloff
6,315,662 B1 11/2001 Jorasch et al.
6,319,124 B1 11/2001 Baerlocher et al.
6,328,649 B1 12/2001 Randall et al.
6,331,143 B1 12/2001 Yoseloff
6,334,814 B1 1/2002 Adams
6,334,864 B1 1/2002 Amplatz et al.
6,336,860 B1 1/2002 Webb
6,336,862 B1 1/2002 Byrne
6,340,158 B2 1/2002 Pierce et al.
6,346,043 B1 2/2002 Colin et al.
6,347,996 B1 2/2002 Gilmore et al.
RE37,588 E 3/2002 Ornstein
6,358,147 B1 3/2002 Jaffe et al.
6,364,766 B1 4/2002 Anderson et al.
6,364,768 B1 4/2002 Acres et al.
6,368,216 B1 4/2002 Hedrick et al.
6,375,187 B1 4/2002 Baerlocher
6,375,567 B1 4/2002 Acres
6,398,218 B1 6/2002 Vancura
6,406,369 B1 6/2002 Baerlocher et al.
6,413,162 B1 7/2002 Baerlocher et al.
6,416,408 B2 7/2002 Tracy et al.
6,419,579 B1 7/2002 Bennett
6,428,412 B1 8/2002 Anderson et al.
6,439,995 B1 8/2002 Hughs-Baird et al.
6,443,837 B1 9/2002 Jaffe et al.
6,454,651 B1 9/2002 Yoseloff
6,464,582 B1 10/2002 Baerlocher et al.
6,471,208 B2 10/2002 Yoseloff et al.
6,481,713 B2 11/2002 Perrie et al.
6,491,584 B2 12/2002 Graham et al.
6,506,116 B1 1/2003 Sunaga et al.
6,506,118 B1 1/2003 Baerlocher et al.
6,533,660 B2 3/2003 Seelig et al.
6,544,120 B2 * 4/2003 Ainsworth .............. G07F 17/34
273/138.2
6,547,242 B1 4/2003 Sugiyama et al.
6,551,187 B1 4/2003 Jaffe
6,558,254 B2 5/2003 Baelocher et al.
6,561,904 B2 5/2003 Loche et al.
6,569,016 B1 5/2003 Baerlocher
6,581,935 B1 6/2003 Odom
6,592,457 B1 7/2003 Frohm et al.
6,602,137 B2 8/2003 Kaminkow et al.
6,604,999 B2 8/2003 Ainsworth
6,607,438 B2 8/2003 Baerlocher et al.
6,626,758 B1 9/2003 Parham et al.
6,632,141 B2 10/2003 Webb et al.
6,638,164 B2 10/2003 Randall et al.
6,641,477 B1 11/2003 Dietz, II
6,648,754 B2 11/2003 Baerlocher et al.
6,648,758 B2 11/2003 Bennett et al.
6,676,512 B2 1/2004 Fong et al.
6,692,356 B2 2/2004 Baerlocher et al.
6,702,673 B2 3/2004 Webb
6,719,630 B1 4/2004 Seelig et al.
6,731,313 B1 5/2004 Kaminkow
6,733,386 B2 5/2004 Cuddy et al.
6,824,465 B2 11/2004 Luciano, Jr.
6,855,055 B2 2/2005 Perrie et al.
6,896,617 B2 * 5/2005 Daly ....................... G07F 17/34
273/143 R
7,128,647 B2 10/2006 Muir
7,192,347 B1 3/2007 Marks et al.
7,410,420 B2 8/2008 Shiraishi
7,654,895 B2 * 2/2010 Pacey ................. G07F 17/3211
273/142 R
8,221,206 B2 * 7/2012 Marks ..................... G07F 17/32
463/16
9,286,746 B2 * 3/2016 Marks ..................... G07F 17/32
2001/0009865 A1 7/2001 Demar et al.
2001/0040341 A1 11/2001 Kamille
2001/0041610 A1 11/2001 Luciano et al.
2002/0052233 A1 5/2002 Gauselmann
2002/0058545 A1 5/2002 Luciano
2002/0086725 A1 7/2002 Fasbender et al.
2003/0017868 A1 1/2003 Crawford
2003/0054875 A1 3/2003 Marks et al.
2003/0064786 A1 4/2003 Weiss
2003/0069064 A1 * 4/2003 Ainsworth .......... G07F 17/3211
463/20
2003/0073480 A1 4/2003 Thomas et al.
2003/0181234 A1 9/2003 Falciglia, Sr.
2003/0190942 A1 10/2003 Kaminkow et al.
2003/0207710 A1 11/2003 Rodgers et al.
2003/0216165 A1 11/2003 Singer et al.
2004/0053657 A1 3/2004 Fiden et al.
2004/0053662 A1 3/2004 Pacey
2004/0058727 A1 3/2004 Marks et al.
2004/0106445 A1 6/2004 Perrie et al.
2004/0185927 A1 9/2004 Baerlocher et al.
2005/0009597 A1 1/2005 Daly
2005/0014553 A1 1/2005 Byrne
2005/0043081 A1 2/2005 Baerlocher
2005/0148384 A1 7/2005 Marks et al.
2005/0192081 A1 9/2005 Marks et al.
2006/0030387 A1 2/2006 Jackson
2006/0068883 A1 3/2006 Randall et al.
2006/0246977 A1 11/2006 Cannon
2007/0060271 A1 3/2007 Cregan et al.

FOREIGN PATENT DOCUMENTS

AU 711501 10/1999
DE 4 201 534 7/1993
EP 0 698 869 2/1996
EP 0 798 676 10/1997
EP 0 874 337 10/1998
EP 0 945 837 A2 3/1999
EP 0 926 645 6/1999
EP 0 944 030 9/1999
EP 0 984 409 A2 3/2000
EP 1 184 822 A3 3/2000
EP 1 067 491 1/2001
GB 2 090 690 A 7/1982
GB 2 096 376 A 10/1982
GB 2 097 160 A 10/1982
GB 2 100 905 A 1/1983
GB 2 105 891 A 3/1983
GB 2 106 682 4/1983
GB 2 117 155 A 10/1983
GB 2 130 413 5/1984
GB 2 137 392 A 10/1984
GB 2 144 644 A 3/1985
GB 2 161 008 A 1/1986
GB 2 170 643 A 8/1986
GB 2 181 589 A 4/1987
GB 2 183 882 A 6/1987
GB 2 191 030 A 12/1987
GB 2 213 624 8/1989
GB 2 222 712 A 3/1990
GB 2 225 889 A 6/1990
GB 2 226 436 A 6/1990
GB 2 242 300 A 9/1991
GB 2 262 642 A 6/1993
GB 2 316 214 2/1998
GB 2 328 311 2/1999
JP 08-010383 1/1996
JP 10-328351 12/1998
JP 2001-017657 1/2001
WO WO 85/00910 2/1985
WO WO 99/64997 12/1999
WO WO 00/12186 3/2000
WO WO 01/15055 3/2001

(56) References Cited

FOREIGN PATENT DOCUMENTS

| | | | |
|---|---|---|---|
| WO | WO 01/26019 | A1 | 4/2001 |
| WO | WO 01/28646 | | 4/2001 |
| WO | WO 02/077935 | A2 | 10/2002 |
| WO | WO 02/102484 | A1 | 12/2002 |
| WO | WO 03/089084 | | 10/2003 |
| WO | WO 03/089088 | A1 | 10/2003 |
| WO | WO 2005/009560 | | 3/2005 |
| WO | WO 2005/086018 | | 9/2005 |

OTHER PUBLICATIONS

Super 8 Line Game (and Description) written by IGT, available prior to 2000.
The iGame Series Brochure written by IGT, available prior to 2000.
Wild Streak Brochures, written by WMS Gaming, Inc., published Mar. 2001.
Neon Nights Advertisement, written by IGT, published in 2000, in or before December thereof.
Jazzy Jackpots Article, published in Strictly Slots, Mar. 2001.
Jazzy Jackpots Advertisement written by Atronic Americas, published in Mar. 2001.
Black Swan Wagering Description and Paytable written by IGT, published prior to 2001.
Free Fall Poker Brochure, written by IGT, available prior to 2001, in or before December thereof.
Tokenization Description written by IGT, available prior to 2001.
Wheel of Fortune Paytable including progressive qualification written by IGT, published prior to 2000.
Vision Bonus Games Advertisement includes "Diamond Fives Buy-A-Bonus Spin," written by IGT, published in 1999 in or before December thereof.
Bueschel, Richard M., Lemons, Cherries and Bell-Fruit-Gum, Nov. 1995, Royal Bell Books, pp. 295-296.
Boxer, Aaron. Where Buses Cannot Go. IEEE Spectrum, Feb. 1995, pp. 41-45.
Barroso, Luiz Andre, Sasan Iman, Jaeheon Jeong, Koray Oner, and Michel Dubois. RPM: A Rabpid Prototyping Engine for Multiprocessor Systems. IEEE Computer, Feb. 1995, pp. 26-34.
Geddes, Robert N. Slot Machines on Parade, First Edition, The Mead Company, Long Beach, California, On or before Dec. 1976, pp. 120, 127, 138.
Christensen, David G., Slot Machines a Pictorial Review, 1976, The Vestal Press, pp. 98-99.
Austin Powers Poker Advertisement written by IGT, published in 2001.
Bally Slot Machines Electro-Mechanicals 1964-1980 Book [In part], Revised 3rd Edition written by Marshall Fey.
Fey, Marshall, Slot machines—A Pictorial History of the First 100 Years, 1997, Liberty Bell Books, 5th Ed., p. 13.
Wagering on Paylines written by IGT, prior to Oct. 5, 2001.
Examination Report; New Zealand Application No. 504492; filed May 17, 2000.

* cited by examiner

GAMING SYSTEM AND METHOD HAVING A PARTIAL SELECTABLE SYMBOL MATRIX

PRIORITY CLAIM

This application is a continuation of, claims priority to and the benefit of U.S. patent application Ser. No. 13/536,412, filed on Jun. 28, 2012, which is a continuation of, claims priority to and the benefit of U.S. patent application Ser. No. 11/045,895, filed on Jan. 27, 2005, now U.S. Pat. No. 8,221,206, which claims priority to and the benefit of U.S. Provisional Patent Application No. 60/539,607, filed on Jan. 28, 2004, the entire contents of each are incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a game in which a player has an opportunity to win multiple awards and potentially large awards or credits are ways to enhance player enjoyment and excitement. Currently, gaming machines or devices provide games, such as slot games, wherein a player has one or more opportunities to obtain a winning symbol combination on mechanical or video reels. In these gaming devices, the player initiates the spin of the reels by making a wager and an award is provided based on the combinations of symbols generated along one or more paylines. Traditional paylines include fixed predetermined symbol display areas arranged adjacently along lines which are horizontal, vertical, diagonal and combinations thereof. The player is able to choose which of the predetermined combinations of symbol display areas will be evaluated for winning combinations of symbols generated in those symbol display areas by activating or wagering on one or more of the predetermined paylines. The player activates a payline based on the amount of the wager made by the player. In other gaming devices, a payout is provided based on a "scatter pay." A scatter pay includes a pay for the occurrence of designated symbols anywhere on the symbol display. Symbols generated on the symbol display are evaluated for winning combinations as if the symbols were generated along a traditional payline of adjacently arranged symbols.

These gaming machines typically have certain features designated for outcomes such as when a player wins a value, when the player advances to a bonus round or when the game terminates. For example, these gaming machines often display the amount of credits earned, flash lights, make sounds or have other features designed to draw attention to the outcome and entertain the player.

Certain known gaming devices have one or more free spin modes or sequences which are provided to the player after a triggering event in a primary game. The triggering event temporarily halts the primary game play and enables a player to enter a free spin mode or sequence wherein one or more free spins are provided to the player. The player plays the free spin mode or sequence, likely receives an award during one or more of the free spins and returns to the base game. Free spin mode or sequences that provide players with large awards or the potential to win large awards are attractive to players.

To increase player enjoyment and excitement, it is desirable to provide players with increased player interaction and control of a gaming feature in a slot machine.

SUMMARY OF THE INVENTION

The present invention provides a gaming device having a game with at least one active symbol position and at least one inactive symbol position wherein any outcome provided to a player is based on the symbols generated at one or more of the active symbol positions.

In one embodiment, the gaming device includes a plurality of symbol generators, such as reels. Each symbol generator is adapted to generate symbols at a plurality of symbol positions. The reels form a symbol matrix of X rows by Y columns (i.e., reels) with Z symbol positions.

In one embodiment, at least one and preferably a plurality of symbol positions are each initially inactive. In another embodiment, each symbol position is initially inactive. In one embodiment, as described below, no symbols will be generated at each inactive symbol position. In another embodiment, if any symbols are generated at the inactive symbol positions, the outcome provided to the player is not influenced by such symbols at the inactive symbol positions.

In one embodiment, at least one and preferably a plurality of symbol positions are each initially active. As described below, the gaming device generates symbols at each active symbol position, wherein the symbols generated at the active symbol positions form one or more symbol combinations. According to an appropriate paytable, awards or payouts are associated with the symbols or symbol combinations generated at the active symbol positions.

In one embodiment, in addition to each symbol position being initially active or inactive, at least one and preferably a plurality of the symbol positions are associated with terminators or 'end indicators'. In one embodiment, each symbol not associated with a terminator is associated with a 'continue indicator'. As described below, a terminator ends the symbol position selection sequence and a continuation indicator enables the player to continue the symbol position selection sequence.

In operation, the gaming device enables the player to select a first symbol position from the symbol matrix and the selected symbol position is activated. Additionally, the gaming device reveals whether a terminator or 'end' indicator is associated with the first selected symbol position. If a terminator is associated with the first selected symbol position, the symbol position selection sequence ends, the player is not enabled to select any more symbol positions and the game proceeds to the symbol generation sequence as described below. If a terminator is not associated with the first selected symbol position (i.e., a 'continue' indicator is associated with the first selected symbol position), the gaming device enables the player to select another symbol position from the symbol matrix. The subsequently selected symbol position is activated and the gaming device reveals whether a terminator is associated with the subsequently selected symbol position. This process continues as described above until the gaming device reveals that one of the selected symbol positions is associated with a terminator.

In other words, the player selects symbol positions to activate and continues to make selections until revealing a terminator.

At the conclusion of the symbol position sequence, the gaming device initiates the symbol generation sequence. The symbol generation sequence includes the gaming device randomly generating a symbol at each active symbol position. The generated symbols form one or more symbol combinations. The gaming device determines an outcome or payout, such as a win $5 or a lose outcome, based on the generated symbols or symbol combinations at the active symbol positions and provides the player the determined outcome. It should be appreciated that in one embodiment, the gaming device does not generate a symbol at each inactive symbol position. In another embodiment, the gaming device generates one or more symbols at one or more inactive symbol positions, but any determined outcome is not based on any symbol generated at any inactive symbol position. Thus, in one embodiment of the present invention, the inactive symbol positions do not form part of any winning symbol combination.

In one embodiment, in addition to any payouts based on the generated symbols or symbol combinations, one or more generated symbols are associated with picks of one or more additional symbol positions. If a generated symbol is associated with a pick of an additional symbol position, the gaming device enables the player to select one or more additional symbol positions to activate. For each subsequent generation of symbols, a symbol is generated at the additionally activated symbol position for evaluation of winning symbol combinations. In one embodiment, the gaming device also provides the player an additional generation of symbols at the currently active symbol positions. In another embodiment, the gaming device does not provide the player any additional generations of symbols based on the associated pick of an additional symbol position.

In another embodiment, in addition to any payouts based on the generated symbols or symbol combinations, one or more generated symbols are associated with one or more additional generations of symbols. In this embodiment, if a symbol associated with an additional symbol generation is generated, the gaming device provides the player one or more additional generations of symbols at the currently active symbol positions.

In one embodiment, the present invention can be employed in conjunction with one or more primary games, such as slot games. In this embodiment, each time the symbol generators are activated (i.e., a symbol is generated at each of the active symbol positions), the player must place one or more separate wagers. In another embodiment, the present invention can be employed in association with free spins or free activations of the symbol generators. In this embodiment, the player is provided a number of free spins or free activations of the symbol generators during which symbols are generated at the activated symbol positions and the game proceeds until a predetermined number of free spins, such as zero, remain or a terminating event or condition occurs and the free spin mode or sequence ends.

The gaming device of the present invention increases player enjoyment by providing the player an opportunity to select the symbol positions which will generate symbols. By providing players with new reel features wherein the new features involve a selection of reel positions to activate, the gaming device of the present invention provides the player with a more exciting gaming experience.

Additional features and advantages of the present invention are described in and will be apparent from, the following Detailed Description of the Invention and the figures.

BRIEF DESCRIPTION OF THE FIGURES

FIGS. 5A, 53, 50, 5D, 5E and 5F are front elevation views of one embodiment of the present invention illustrating the generation of a plurality of symbols at the active symbol positions.

DETAILED DESCRIPTION OF THE INVENTION

Figure 1A:
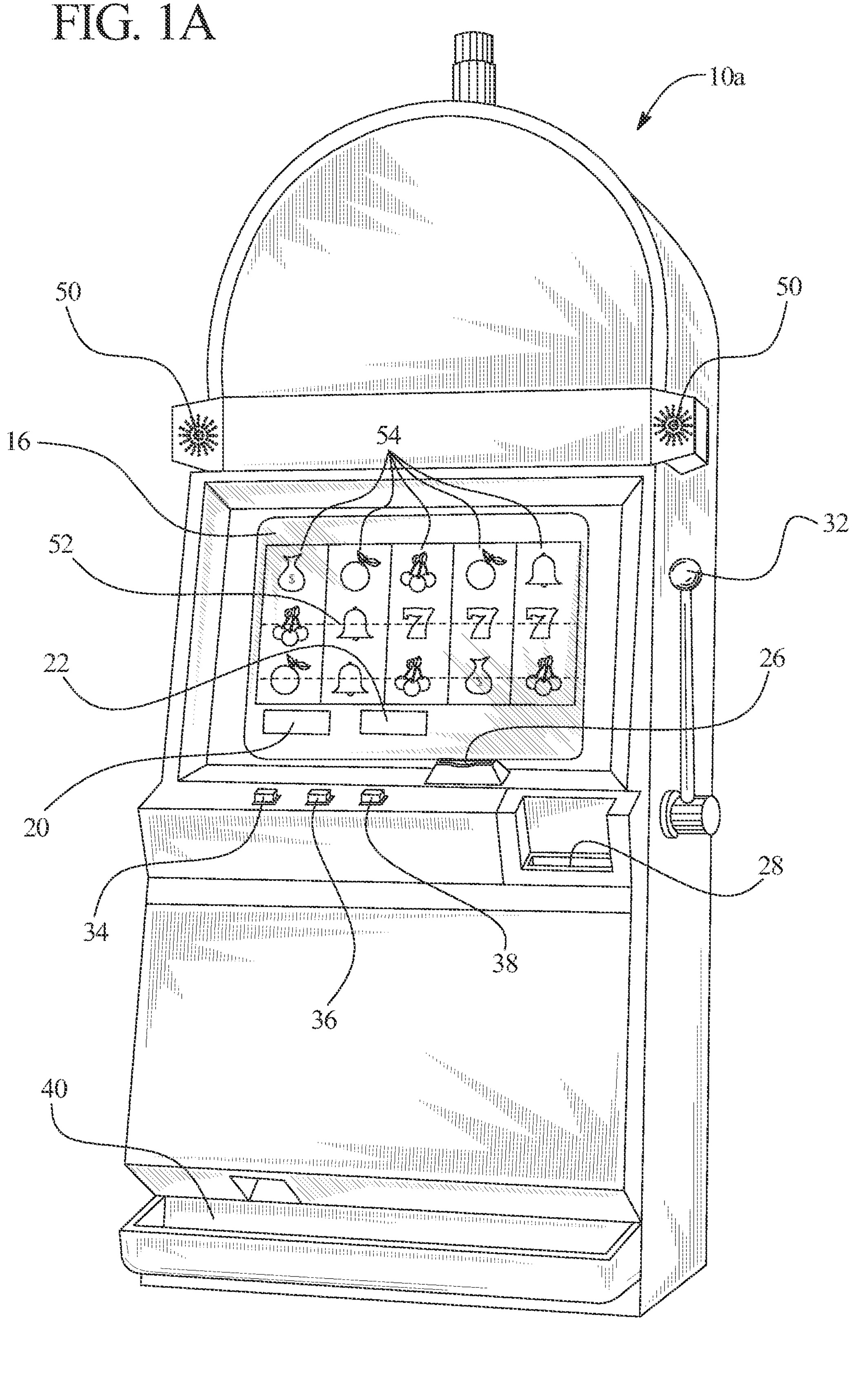
FIG. 1A is a front-side perspective view of one embodiment of the gaming device of the present invention.
Figure 1B:
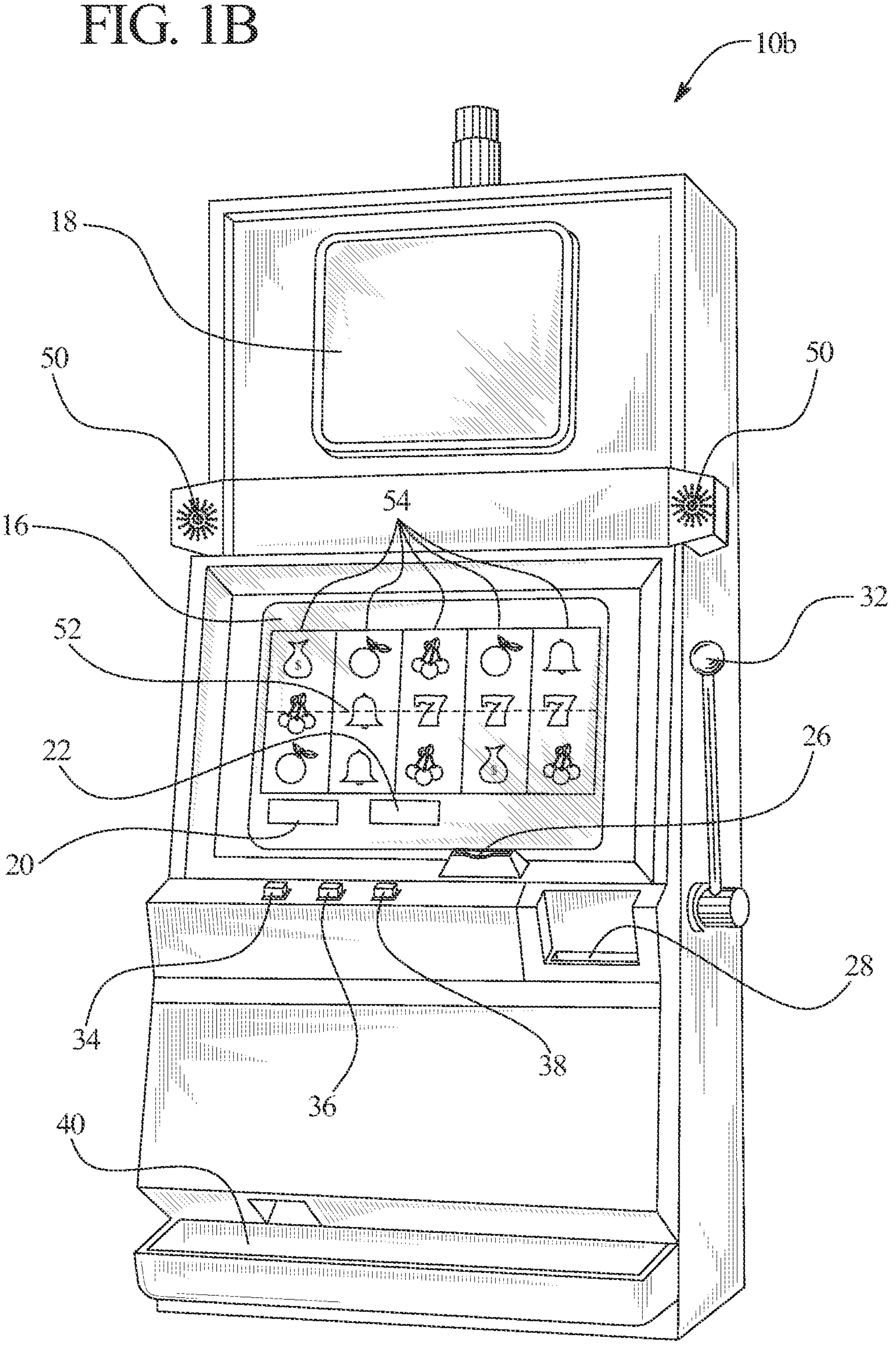
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 108 and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
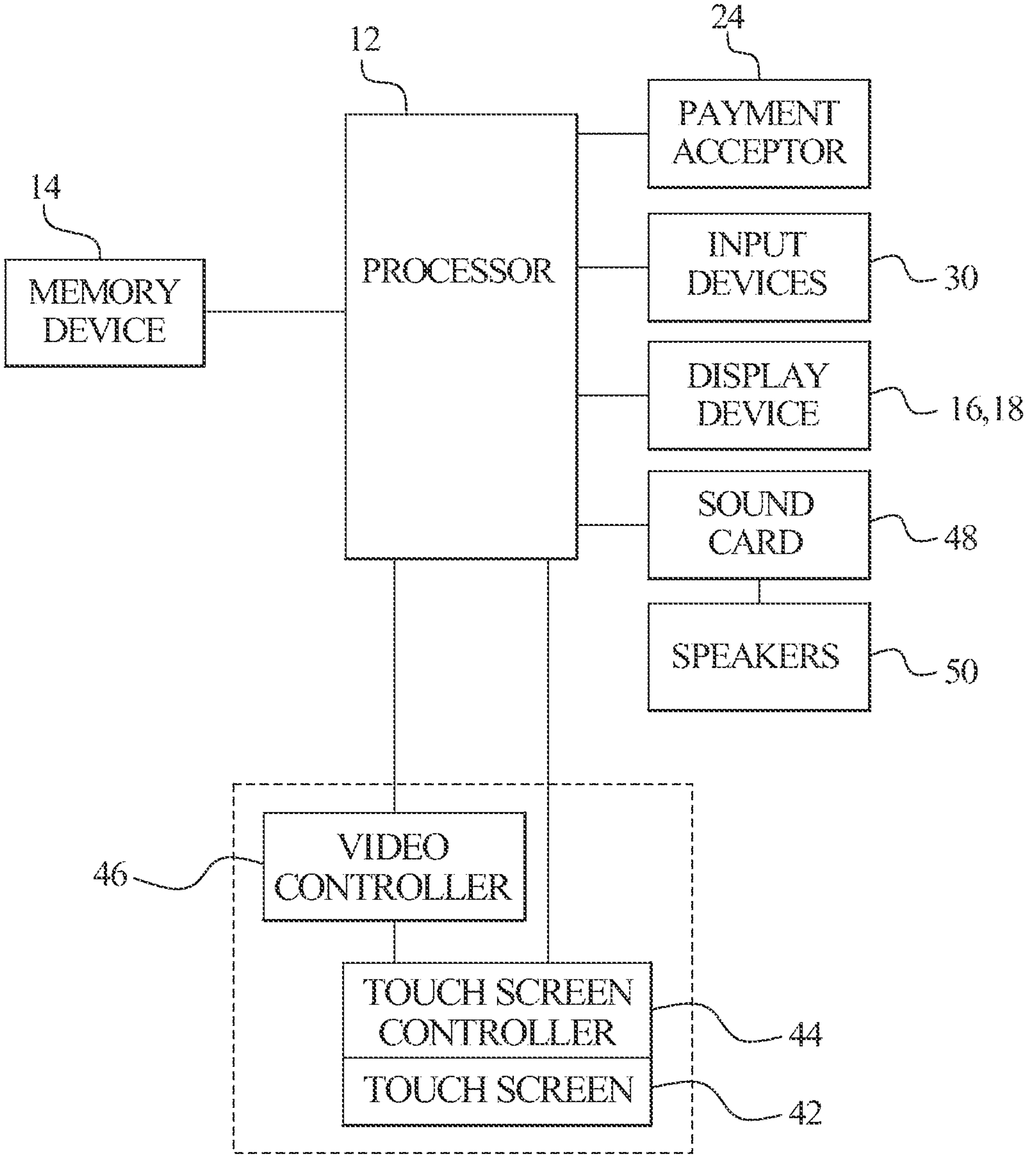
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. As described in more detail below, the memory device also stores outcome data relating or corresponding to one or more generated outcomes. In different embodiments, the outcome data relates to any previously generated outcomes, any symbols associated with the previously generated outcomes or any other suitable outcome data. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be flagged in a detachable or removable memory device, including, but not limited to, a suitable cartridge, disk or CD ROM. A player can use such a removable memory device in a desktop, a laptop personal computer, a personal digital assistant (FDA) or other computerized platform. The processor and memory device may be collectively referred to herein as a "computer" or "controller."

In one embodiment, as discussed in more detail below, the gaming device randomly generates game outcomes, such as awards, based on probability data. That is, each game outcome is associated with a probability and the gaming device generates the game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of game outcomes, such as awards. In this embodiment, as each game outcome is provided to the player, the gaming device removes the provided game outcome from the predetermined set or pool. Once removed from the set or pool, the specific provided game outcome cannot be provided to the player again (i.e., unless during a subsequent regeneration of a previously flagged outcome as described in more detail below). In one embodiment, each outcome stored in the set or pool of game outcomes is displayed to the player as the initial generation of an outcome coupled with the subsequent regeneration of the outcome. For example, a game outcome of win $10 may be displayed to the player as an initial generation of a win $5 outcome and also as a subsequent regeneration of the win $5 outcome to total the win $10 outcome that was removed from the set or pool of game outcomes. This type of gaming device provides players with all of the available game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a FDA or tablet PC, that enables at least a portion of the primary or secondary game to be played at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, as described in more detail below, the bonus game may consist of one or more regenerations of previously generated outcomes. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game, rather they must win or earn entry through play of the primary game and thus, play of the primary game is encouraged. In another embodiment, qualification of the bonus or secondary game could be accomplished through a simple "buy in" by the player if, for example, the player has been unsuccessful at qualifying through other specified activities.

Figure 2B:
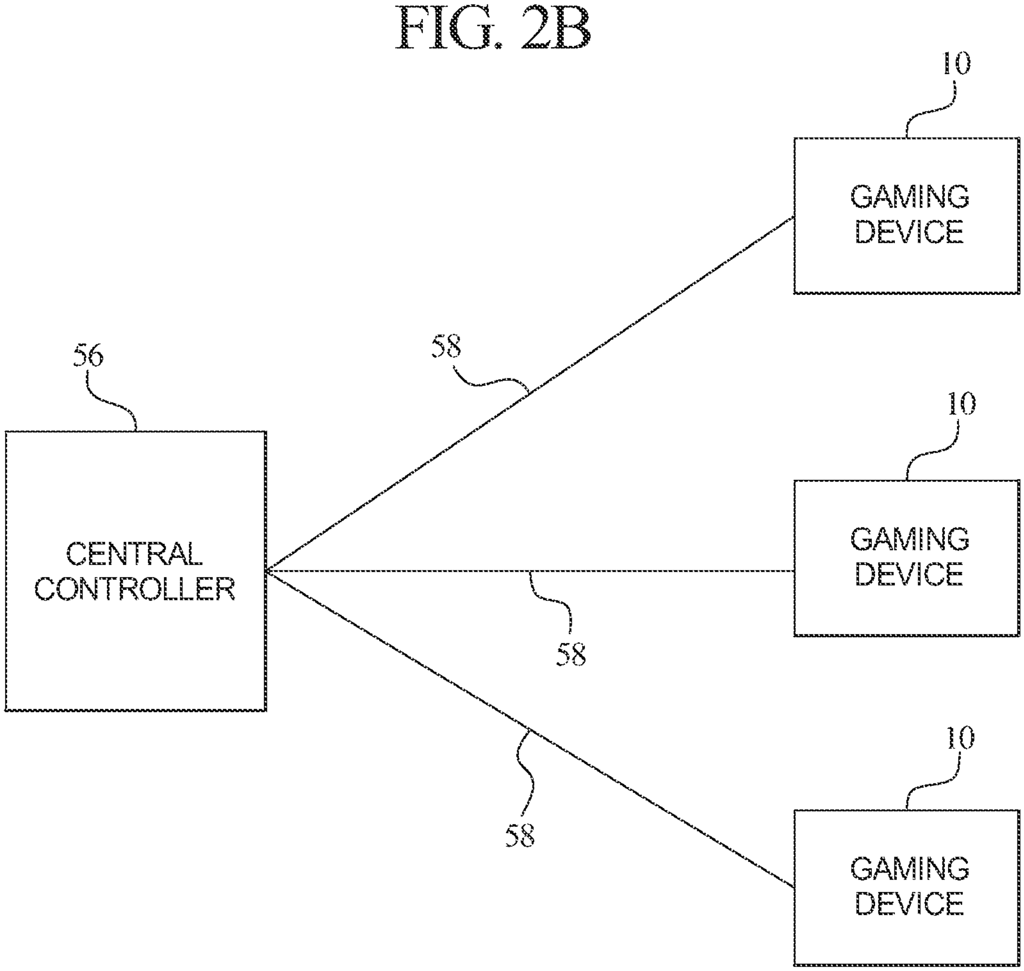
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, an initial generation of a game outcome coupled with any subsequent regenerations of that game outcome or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable or other suitable connection. In this embodiment, players may access an internet game page from any location where an internet connection and computer or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event outcomes or awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to and receive information from, the host site computer. Each central server computer is responsible for all data communication between the gaming device hardware and software and the host site computer.

Symbol Position Selection and Generation

Figure 3:
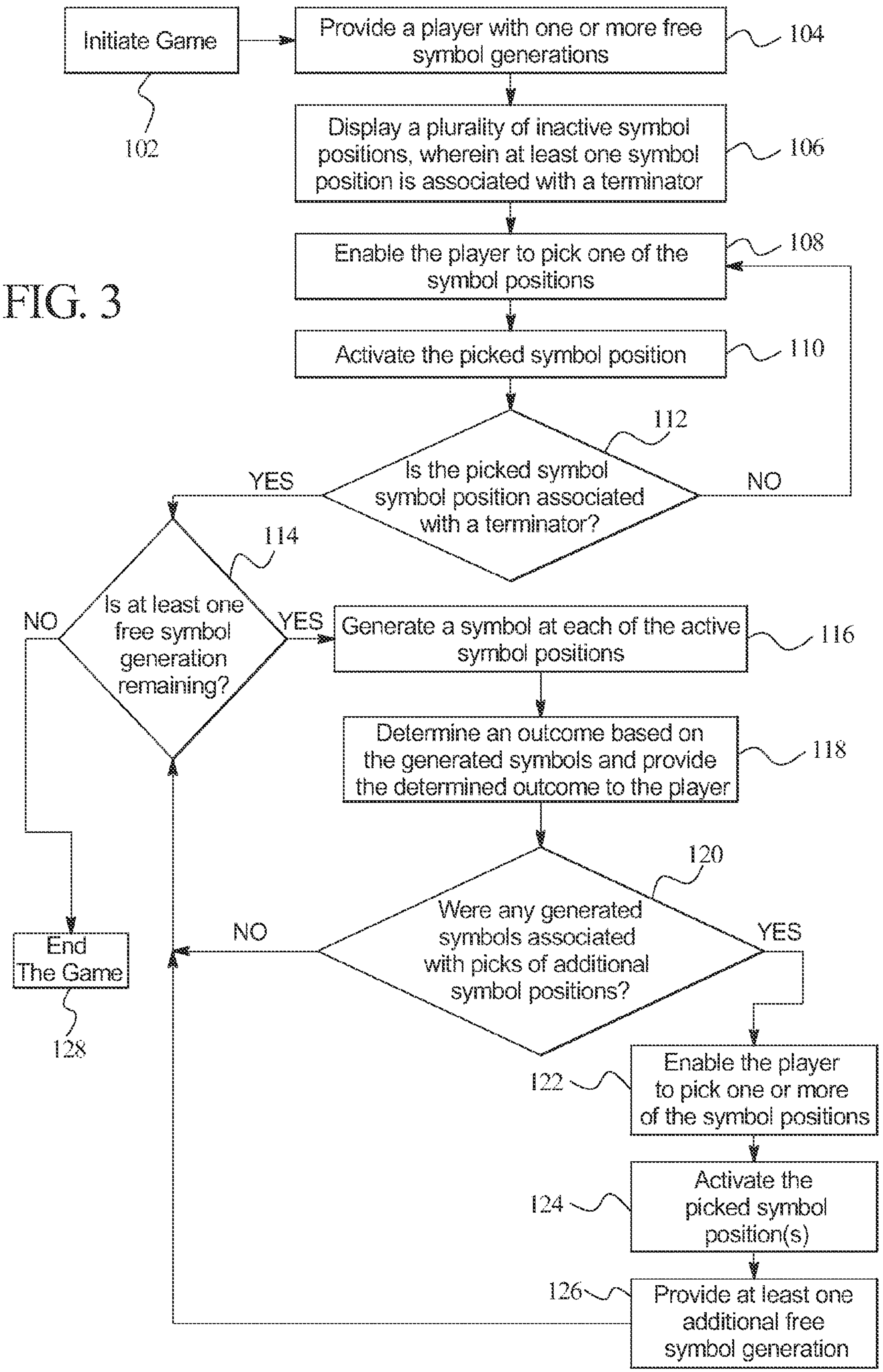
FIG. 3 is a flowchart of a one embodiment of the present invention illustrating the symbol position sequence and the symbol generation sequence of the present invention.

Referring now to FIG. 3, in one embodiment of the present invention employed as a free spin game, upon or after a suitable triggering event, the gaming device initiates the game and provides a player with one or more free symbol generations or free spins, as indicated in blocks 102 and 104. In different embodiments, the number of free symbol generations are predetermined, randomly determined, determined based on the player's wager in a primary game, determined from the occurrence of one or more symbols in a primary game or determined based on any other suitable method.

The gaming device displays a plurality of inactive symbol positions, wherein at least one symbol position is associated with a terminator as indicated in block 106. A terminator functions to end the symbol position selection sequence of the game and initiate the symbol generation sequence. In one embodiment, each symbol position is initially inactive. In another embodiment, at least one and preferably a plurality of symbol positions are each initially inactive. In this embodiment, at least one and preferably a plurality of the symbol positions are each initially active. In one embodiment, the inactive symbol positions are designated by an illustration of a closed door, however it should be appreciated that the inactive (or active) symbol positions may be illustrated in any suitable manner.

In one embodiment, the gaming device enables the player to pick one of the symbols positions from the symbol matrix as indicated in block 108. In another embodiment, the gaming device enables the player to pick a plurality of the symbol positions. In another embodiment, the gaming device enables the player to pick from a subset of the symbol positions. In one embodiment, the gaming device picks one or more of the symbol positions. In another embodiment, the gaming device picks at least one of the symbol positions and the player picks at least one of the symbol positions.

In one embodiment, the picked symbol position is activated as indicated in block 110. In another embodiment, one or more symbol positions are additionally activated based on the picked symbol position. In another embodiment, in addition to activating the picked symbol position, an award is revealed as associated with the picked symbol position and the revealed award is provided to the player.

After activating the picked symbol positions, the gaming device determines if the picked symbol position is associated with a terminator as indicated in diamond 112. If the picked symbol position is not associated with a terminator, the gaming device enables the player to pick another one of the symbol positions from the symbol matrix as indicated in block 108. This process continues as described above until one of the picked symbol positions is associated with a terminator.

If the picked symbol position is associated with a terminator, the gaming device ends the symbol position selection sequence. The gaming device then determines if the player has at lease one free symbol generation (i.e., at least one free spin) remaining as indicated in diamond 114. In one embodiment, if a selected symbol position is associated with a terminator, that selected symbol position is activated. In another embodiment, if a selected symbol position is associated with a terminator, that selected symbol position is not activated (or otherwise deactivated).

If at least one free symbol generation is remaining in the free spin or free activation embodiment of the present invention, the gaming device generates a symbol at each of the active symbol positions as indicated in block 116. In one embodiment, each symbol position is associated with an individual symbol generator that generates a symbol at that symbol position. For example, each symbol position utilizes its own independent reel strip. In another embodiment, a plurality of symbol positions are each associated with one symbol generator that generates symbols at each of the associated active symbol positions. For example, one symbol generator (i.e., one reel strip) may generate all of the symbols for each of the active symbol positions associated with that reel. It should be appreciated that any suitable manner of generating symbols may be utilized in accordance with the present invention.

After generating a symbol at each of the active symbol positions, the gaming device determines an outcome or award based on the generated symbols or symbol combinations and provides the determined outcome or award to the player as indicated in block 118. In one embodiment, symbols are not generated at each inactive symbol position. In an alternative embodiment, a symbol is generated at one or more inactive symbol positions, but such symbols are ghosted or grayed and cannot form part of any winning symbol combination.

After providing the player the determined outcome or award, the gaming device determines if any of the generated symbols are associated with one or more picks of additional symbol positions as indicated in diamond 120. In one embodiment, at least one symbol is associated with a pick of an additional symbol position. In another embodiment, a plurality of symbols are each associated with picks of additional symbol positions. In different embodiments, the number of symbols associated with picks of additional symbol positions is predetermined, randomly determined, determined based on the player's wager in a primary game, determined from the occurrence of one or more symbols in a primary game or determined based on any other suitable method.

If a generated symbol is associated with a pick of an additional symbol position, the gaming device enables the player to select one or more of the symbol positions, activates the picked symbol positions and provides at least one additional free symbol generation (i.e., at least one free spin) to the player as indicated in blocks 122, 124 and 126. In an alternative embodiment, if a generated symbol is associated with a pick of an additional symbol position, the gaming device enables the player to select one or more of the symbol positions and activates the picked symbol positions without providing at least one additional free symbol generation (i.e., at least one free spin) to the player.

After providing the player with at least one additional free symbol generation or if one of the generated symbols is not associated with an additional symbol position selection, the gaming device determines if at least one free symbol generation remains as indicated in diamond 114. If at least one free symbol generation remains, the gaming device generates a symbol at each of the active symbol positions (including any subsequently activated player picked symbol positions) as indicated in block 116 and continues the process as described above. If no free symbol generations are remaining, the symbol generation sequence is complete and the gaming device ends the game as indicated in block 128.

Figure 4A:
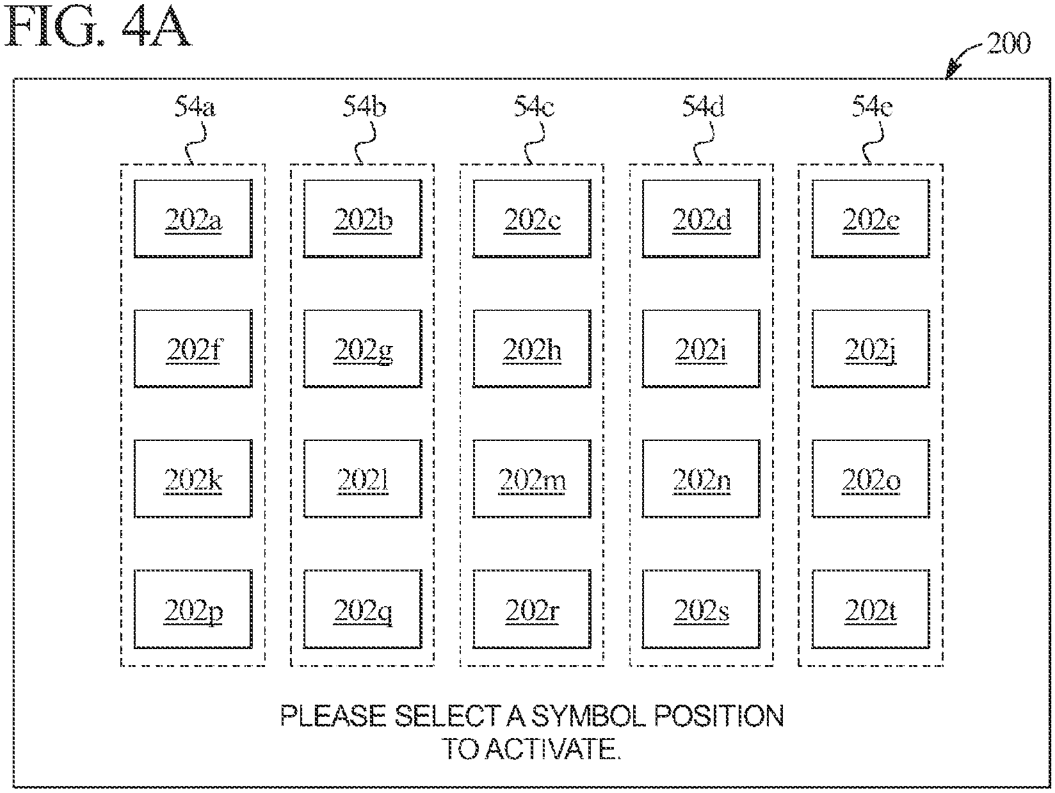
FIGS. 4A, 4B, 4C and 4D are front elevation views of one embodiment of the present invention illustrating the selection and activation of a plurality of symbol positions.

Referring now to FIG. 4A, in one embodiment of the present invention, upon or after a suitable triggering event, the gaming device provides a screen or display 200 which enables a player to make selections to activate one or more symbol positions. In this embodiment, the gaming device provides a plurality of symbol generators, such as reels 54*a*, 54*b*, 54*c*, 54*d* and 54*e*. Each symbol generator or display is adapted to generate symbols at a plurality of symbols positions 202*a* to 202*t*. In this example, reel 54*a* includes symbol positions 202*a*, 202*f*, 202*k* and 202*p*, reel 54*b* includes symbol positions 202*b*, 202*g*, 2021 and 202*q*, reel 54*c* includes symbol positions 202*c*, 202*h*, 202*m* and 202*r*, reel 54*d* includes symbol positions 202*d*, 202*i*, 202*n* and 202*s* and reel 54*e* includes symbol positions 202*e*, 202*j*, 202*o* and 202*t*.

In one embodiment, at least one and preferably a plurality of the symbol positions are initially inactive. As described above, a symbol generated at an inactive symbol position cannot be part of a winning symbol combination because only symbols generated at active symbol positions may be part of winning symbol combinations in this embodiment. In another embodiment, as illustrated in FIG. 4A, each of the symbol positions are initially inactive. In one embodiment, a plurality of the reels each include at least one initially inactive symbol position. In another embodiment, a plurality of the reels each include a plurality of initially inactive symbol positions. In another embodiment, each of the reels includes at least one initially inactive symbol position. In another embodiment, each of the reels includes a plurality of initially inactive symbol positions.

In different embodiments, the number of initially inactive symbol positions is predetermined, randomly determined, determined based on the player's wager in a primary game, determined from the occurrence of one or more symbols in a primary game or determined based on any other suitable method. In different embodiments, the location of each initially inactive symbol position is predetermined, randomly determined, determined based on the players wager in a primary game, determined from the occurrence of one or more symbols in a primary game or determined based on any other suitable method.

In addition to each symbol position being in an active or inactive state, as described above, at least one of the symbol positions is associated with a terminator. In one embodiment, a plurality of symbol positions are each associated with terminators. In one embodiment, a plurality of the reels each include at least one symbol position associated with a terminator. In another embodiment, a plurality of the reels each include a plurality of symbol positions associated with a terminator. In another embodiment, each of the reels includes at least one symbol position associated with a terminator. In another embodiment, each of the reels includes a plurality of symbol positions associated with a terminator.

In different embodiments, the number of symbol positions associated with terminators is predetermined, randomly determined, determined based on the player's wager in a primary game, determined from the occurrence of one or more symbols in a primary game or determined based on any other suitable method. In different embodiments, the location of each symbol position associated with a terminator is predetermined, randomly determined, determined based on the player's wager in a primary game, determined from the occurrence of one or more symbols in a primary game or determined based on any other suitable method.

As illustrated in FIG. 4A, the gaming device enables the player to select one of the symbol positions. In an alternative embodiment, the gaming device enables the player to select a plurality of symbol positions to activate. Appropriate messages such as "PLEASE SELECT A SYMBOL POSITION TO ACTIVATE" may be provided to the player visually, or through suitable audio or audiovisual displays.

Figure 4B:
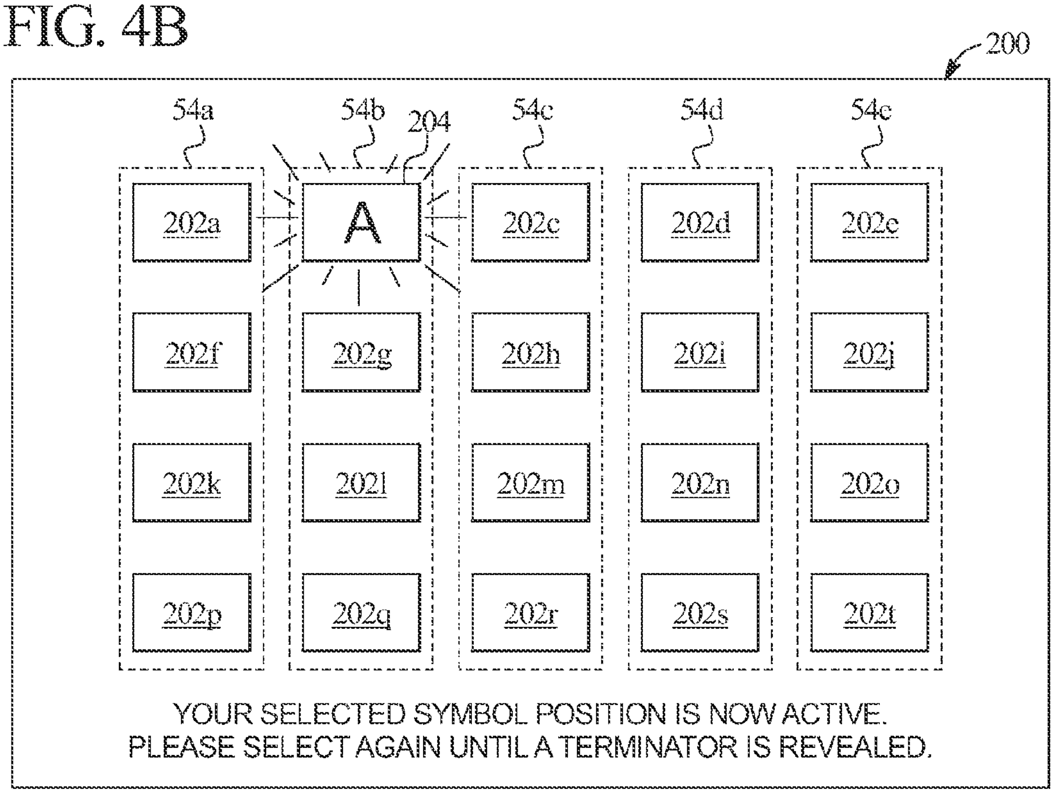

As illustrated in FIG. 4B, the player selected symbol position 202*b* which the gaming device subsequently activated (as illustrated with the "A" 204). After activating the selected symbol position, the gaming device determines if the picked symbol position is associated with a terminator. In this example, as the player picked symbol position is not associated with a terminator, the gaming device enables the player to pick another symbol position. Appropriate messages such as "YOUR SELECTED SYMBOL POSITION IS NOW ACTIVE" and "PLEASE SELECT AGAIN UNTIL A TERMINATOR IS REVEALED" may be provided to the player visually, or through suitable audio or audiovisual displays.

Figure 4C:
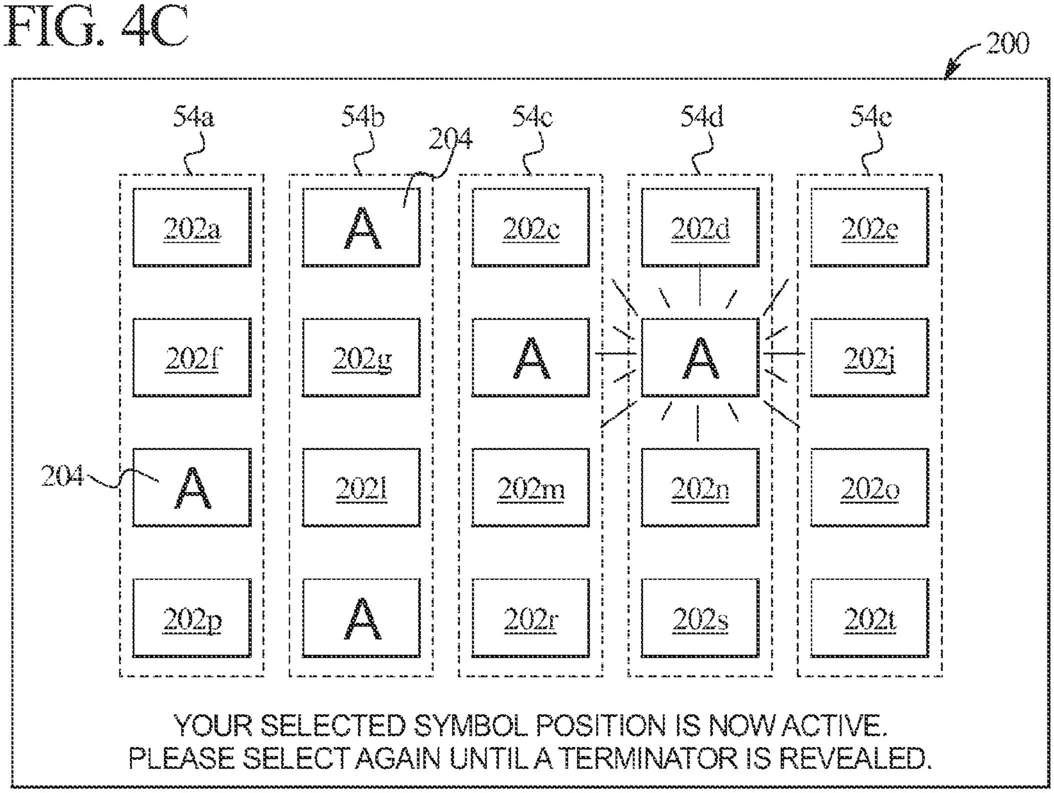

FIG. 4C illustrates this example after symbol positions 202*h*, 202*k* and 202*q* have each been subsequently picked by the player and activated (as illustrated with the "A" 204). As illustrated in FIG. 40, the players most recently picked symbol position 202*i* is activated and the gaming device determined that the player picked symbol position is not associated with a terminator. Accordingly, the gaming device enables the player to pick another symbol position. Appropriate messages such as "YOUR SELECTED SYMBOL POSITION IS NOW ACTIVE" and "PLEASE SELECT AGAIN UNTIL A TERMINATOR IS REVEALED" may be provided to the player visually, or through suitable audio or audiovisual displays.

Figure 4D:
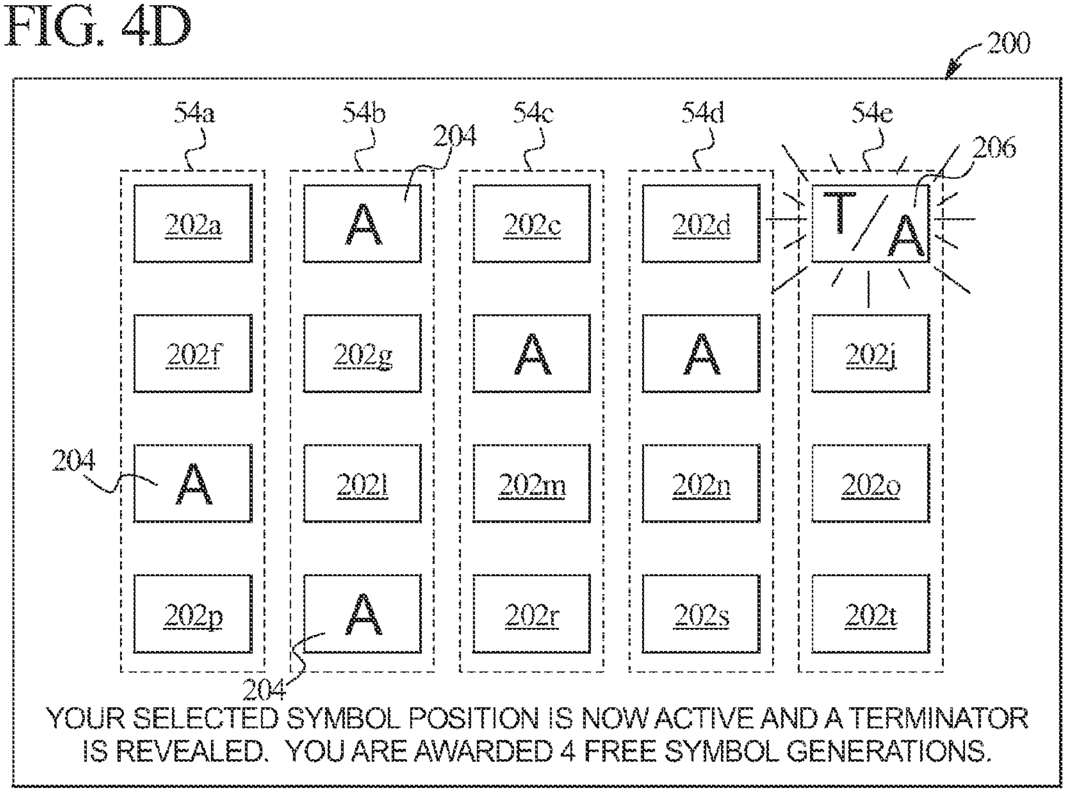

As illustrated in FIG. 4D, the player's next picked symbol position 202*e* is activated. After activating the picked symbol position, the gaming device determines that symbol position 202*e* is associated with a terminator 206 (as illustrated with the "PA"). In this embodiment, upon the selection of a symbol position associated with a terminator, the gaming device provides the player zero, one or more generations or activations of the symbol generators. In this example, the gaming device provides the player four symbol generations at the active symbol positions and ends the symbol position selection sequence. Appropriate messages such as "YOUR SELECTED SYMBOL POSITION IS NOW ACTIVE AND A TERMINATOR IS REVEALED" and "YOU ARE AWARDED 4 FREE SYMBOL GENERATIONS" may be provided to the player visually, or through suitable audio or audiovisual displays.

In alternative embodiments, the symbol position sequence may end after any termination event, after any number of termination events and/or after a designated number of symbol positions are activated. In a different embodiment, the designated number of active symbol positions that causes an end of the symbol position sequence is predetermined, randomly determined, determined based on the player's wager in a primary game, determined from the occurrence of one or more symbols in a primary game or determined based on any other suitable method.

In one embodiment, the symbol position sequence may end after a designated number of picks of the symbol positions. In this embodiment, rather than associated at least one symbol position with a terminator, the player is enabled to pick a designated number of symbol positions and each of the player picked symbol positions are activated. In different embodiment, the designated number of picks of the symbol positions is predetermined, randomly determined, determined based on the player's wager in a primary game, determined from the occurrence of one or more symbols in a primary game or determined based on any other suitable method.

Figure 5A:
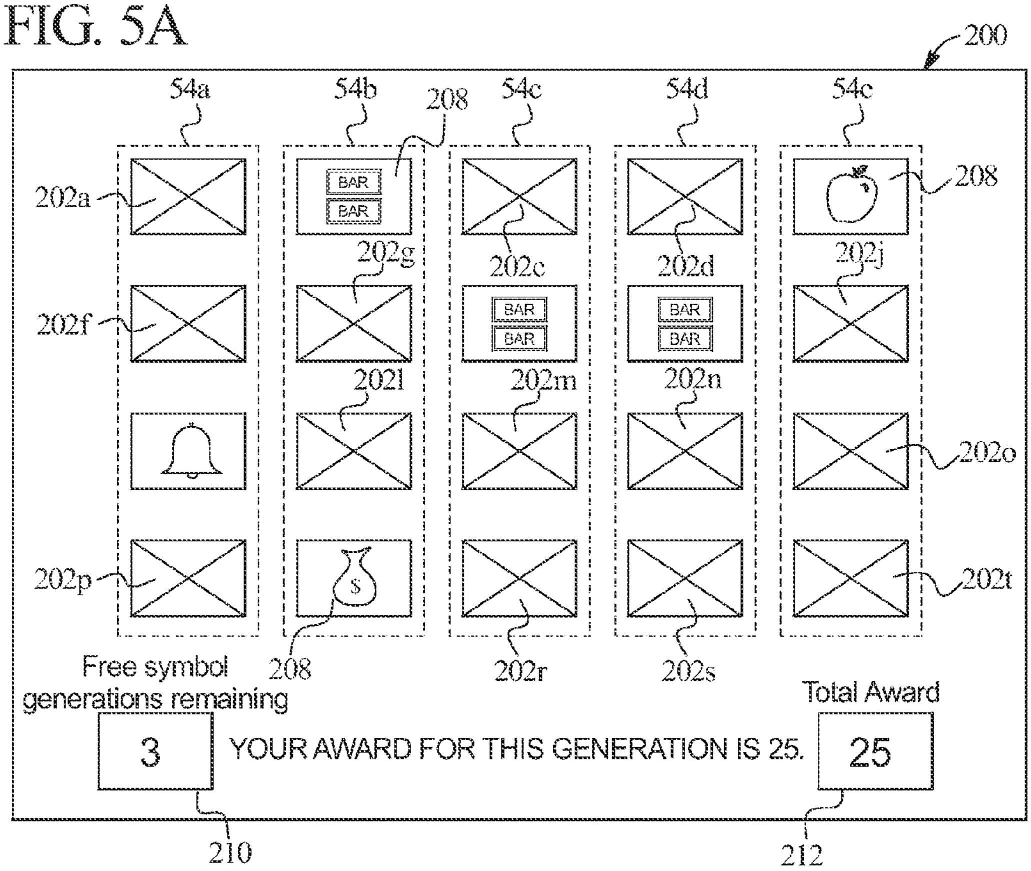

As illustrated in FIG. 5A, after determining that at least one free generation remains, the gaming device generates a symbol 208 at each of the active symbol positions. In this embodiment, the gaming device does not generate any symbols at each inactive symbol display. It should be appreciated that in this embodiment, as the gaming device does not generate any symbols at the inactive symbol positions and at least one symbol position remains inactive, the gaming device is generating symbols at part, but not all of the symbol matrix.

In an alternative embodiment, the gaming device may generate symbols at one, more or each of the inactive symbol displays, but those generated symbols are for display purposes only and form no part of any outcome provided to the player. The gaming device determines an outcome, such as an award or value, based on the symbols or combination of symbols generated at the active symbol positions. As seen FIG. 5A, an outcome of an award of twenty-five was determined and provided to the player based on the combination of symbols generated at the active symbol positions. A total award display 212 indicates the total value of the awards provided to the player. A free symbol generations remaining display 210 indicates the number of symbol generations remaining. Appropriate messages such as "YOUR AWARD FOR THIS GENERATION IS 25" may be provided to the player visually, or through suitable audio or audiovisual displays.

In different embodiments, the determined outcomes or awards may be values, prizes, modifiers or multipliers, progressive amounts, progressive amount meters, free spins, free games, additional selections of symbol positions, game elements or any other suitable type of award. In one embodiment, each of the awards are different. In another embodiment, a plurality of the awards are different. In another embodiment, each of the awards are the same. In one embodiment, each of the awards are selected from one or more pools of awards. In another embodiment, each of the awards are selected from one or more ranges of awards. In another embodiment, each of the awards is associated with a probability and each of the awards is selected based on the associated probabilities. In different embodiments, the awards are predetermined, randomly determined, determined based on the player's wager in a primary game, determined from the occurrence of one or more symbols in a primary game or determined based on any other suitable method.

After determining the outcome, the gaming device determines if any generated symbols are associated with any picks of additional symbol positions. In this example, none of the generated symbols are associated with any additional picks. The gaming device then determines if at least one symbol generation remains.

Figure 5B:
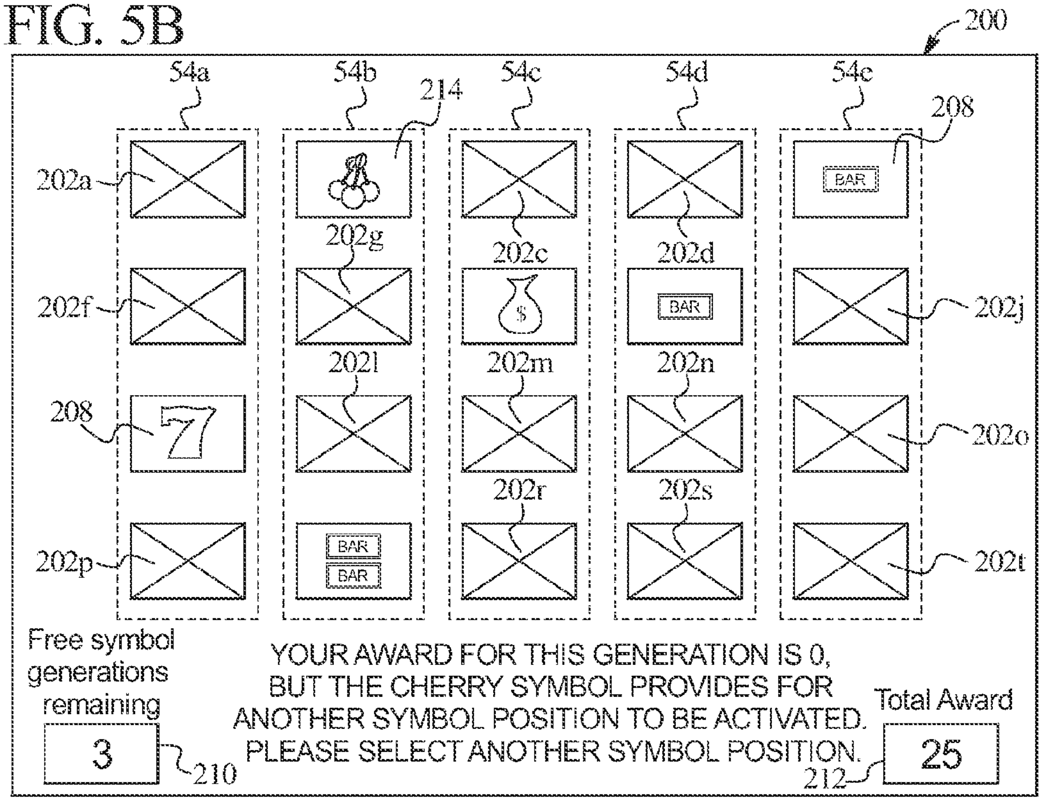

As illustrated in FIG. 5B, as at least one symbol generation remains, the gaming device generates a symbol 208 at each of the active symbol positions. The gaming device determines an outcome based on the symbols or combination of symbols generated at the active symbol positions. As seen FIG. 5B, an outcome of no award was determined based on the combination of symbols generated at the active symbol positions. After determining the outcome, the gaming device determines if any generated symbols are associated with any picks of additional symbol positions. In this example, as the cherry symbol 214 is associated with one additional pick of the symbol positions, the player is enabled to pick another one of the symbol positions to activate. As described above, as the additional pick of the symbol position provides the player at least one additional generation, the free symbol generations remaining display is updated to reflect the additional generation provided to the player (i.e., not reduced from the previous generation). Appropriate messages such as "YOUR AWARD FOR THIS GENERATION IS 0, BUT THE CHERRY SYMBOL PROVIDES FOR ANOTHER SYMBOL POSITION TO BE ACTIVATED" and "PLEASE SELECT ANOTHER SYMBOL POSITION" may be provided to the player visually, or through suitable audio or audiovisual displays.

Figure 5C:
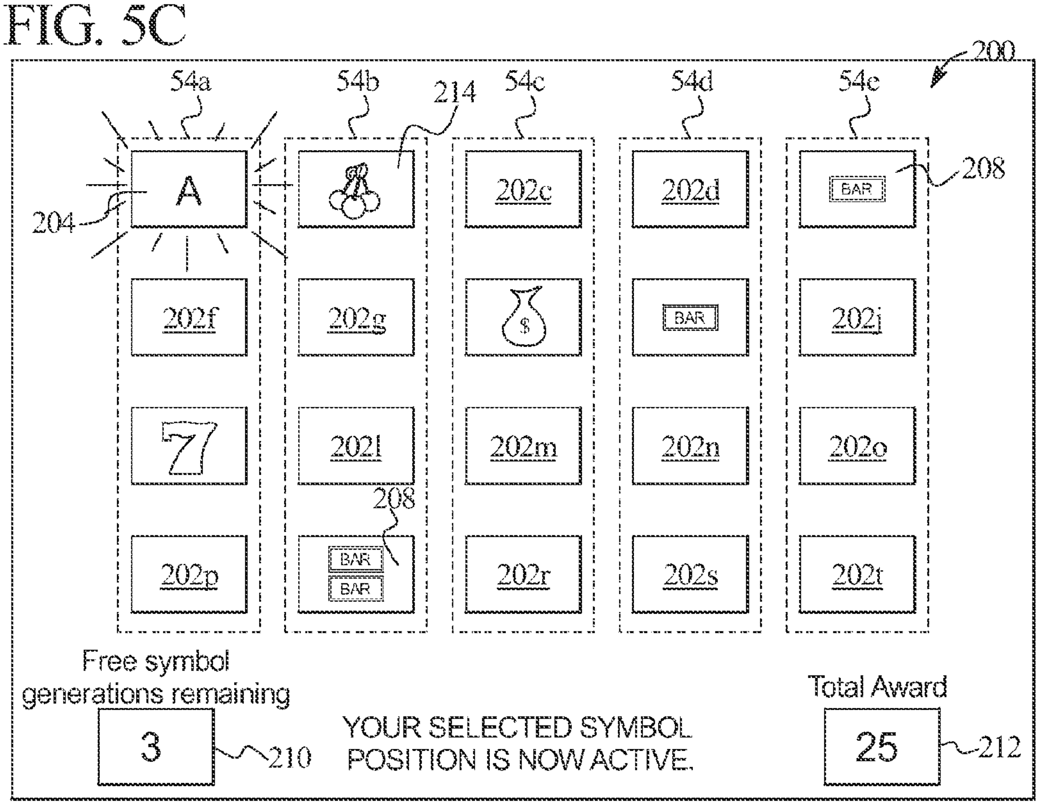

As illustrated in FIG. 5C, the player selected symbol position 202*a* to activate. In one embodiment, this additionally activated symbol position remains active for one or more subsequent symbol generations. In another embodiment, this additionally activated symbol position remains active for each subsequent symbol generation. Appropriate messages such as "YOUR SELECTED SYMBOL POSITION IS NOW ACTIVE" may be provided to the player visually, or through suitable audio or audiovisual displays.

Figure 5D:
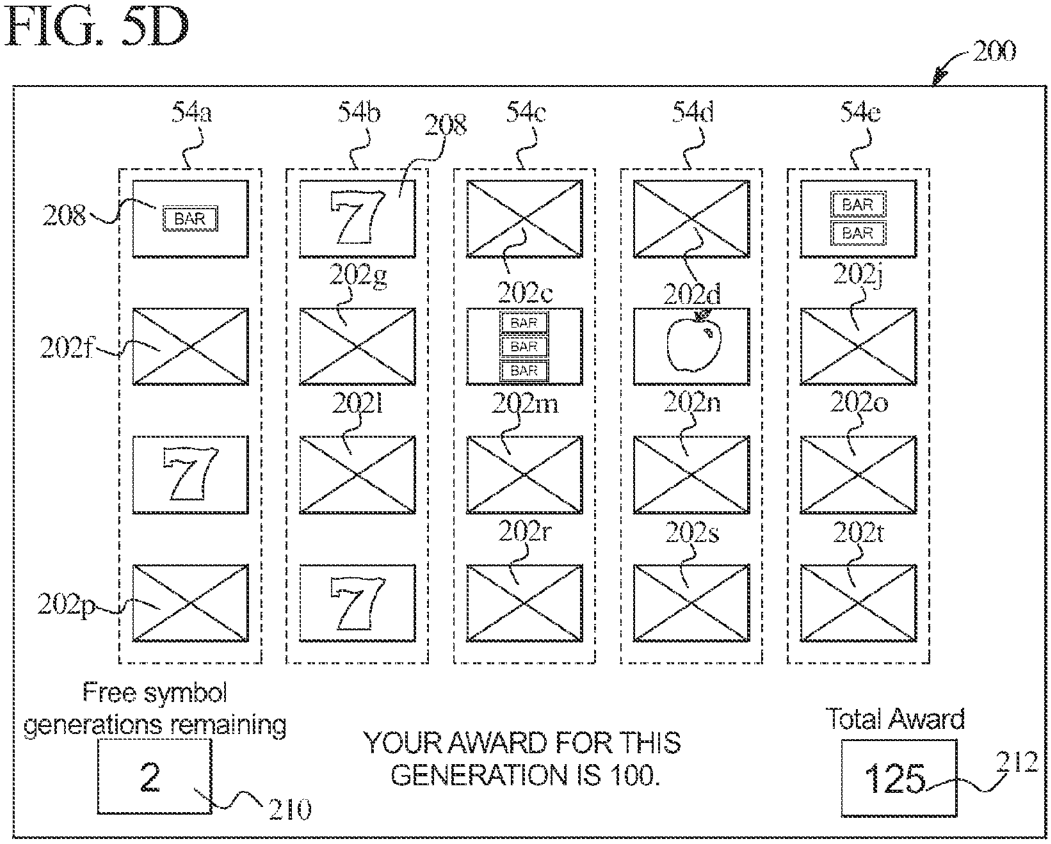

As illustrated in FIG. 5D, after activating the additionally picked symbol position and determining that at least one symbol generation remains, the gaming device generates symbols at each of the currently active symbol positions. It should be appreciated that this generation includes the recently activated symbol position. The gaming device determines an outcome based on the symbols or combination of symbols generated at the currently active symbol positions. In this example, an outcome of an award of 100 was determined and provided to the player based on the combination of symbols generated at the active symbol positions. The total award display is updated to include the provided award and the free symbol generations remaining display is reduced by one to reflect the symbol generation. The gaming device further determines that none of the generated symbols are associated with any additional picks of the symbol positions. Appropriate messages such as "YOUR AWARD FOR THIS GENERATION IS 100" may be provided to the player visually, or through suitable audio or audiovisual displays.

Figure 5E:
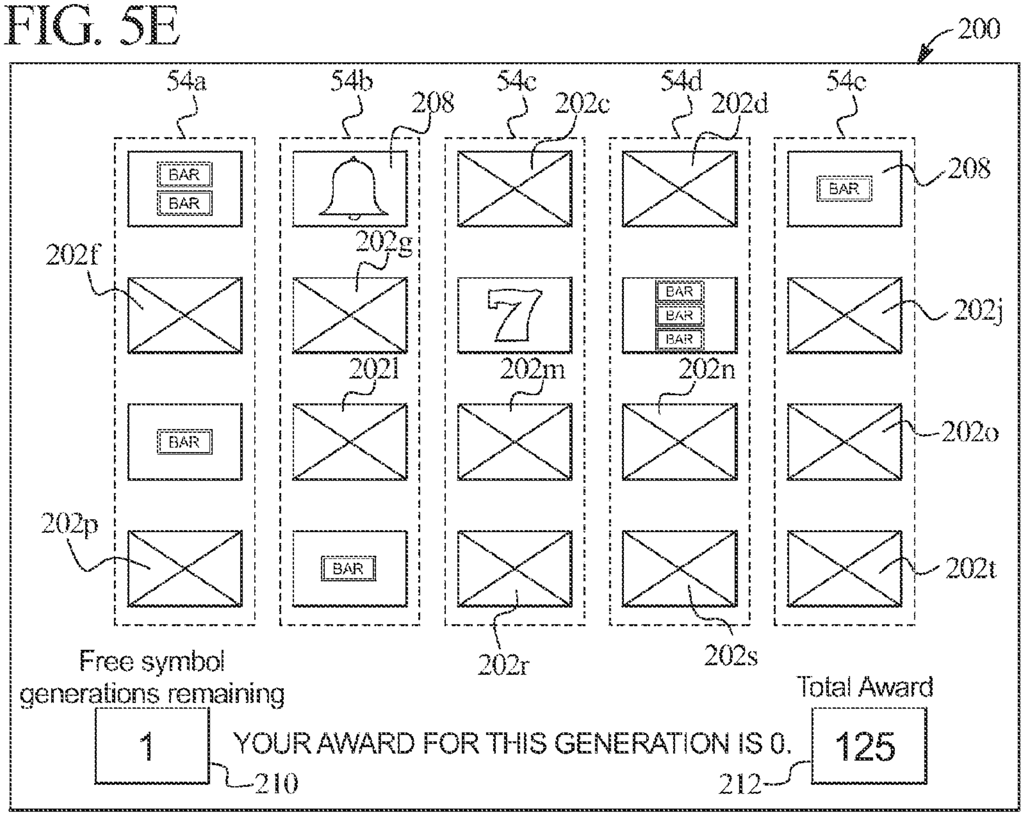

As illustrated in FIG. 5E, after determining that at least one symbol generation remains, the gaming device generates symbols at each of the currently active symbol positions. The gaming device determines an outcome based on the symbols or combination of symbols generated at the active symbol positions. In this example, an outcome of no award is determined based on the combination of symbols generated at the active symbol positions. The free symbol generations remaining display is reduced by one to reflect the symbol generation and the gaming device further determines that none of the generated symbols are associated with any additional picks of the symbol positions. Appropriate messages such as "YOUR AWARD FOR THIS GENERATION IS 0" may be provided to the player visually, or through suitable audio or audiovisual displays.

Figure 5F:
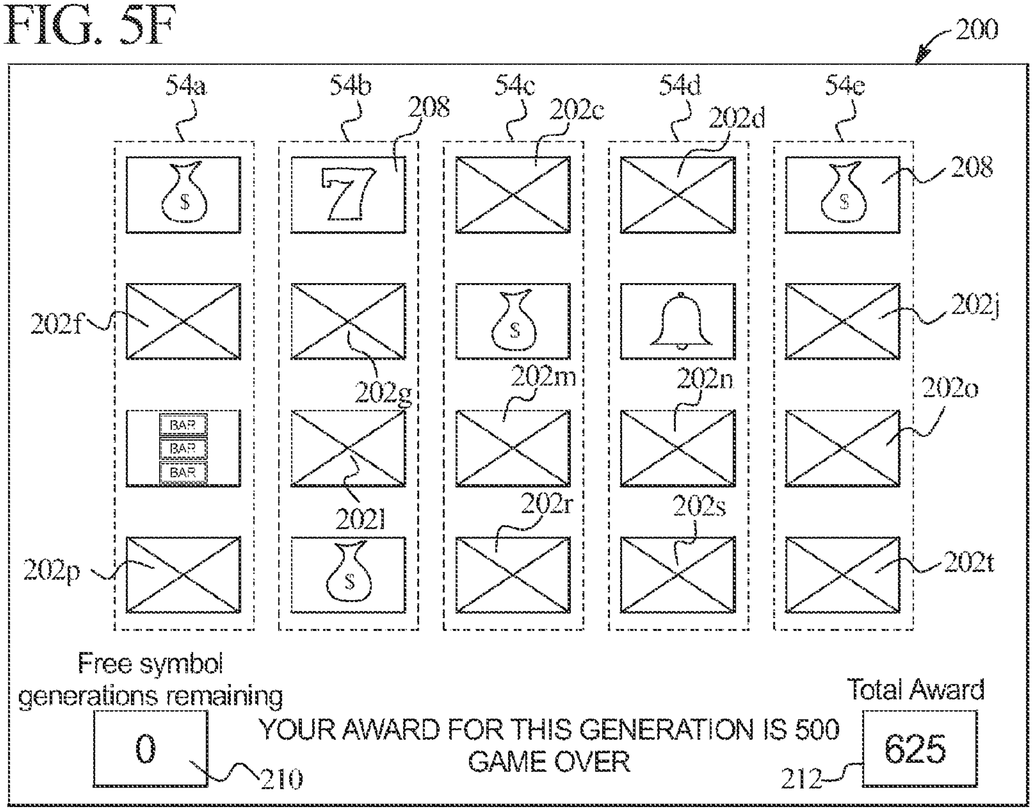

As illustrated in FIG. 5F, after determining that at least one symbol generation remains, the gaming device generates symbols at each of the currently active symbol positions. The gaming device determines an outcome based on the symbols or combination of symbols generated at the active symbol positions. In this example, an outcome of an award of 500 was determined and provided to the player based on the combination of symbols generated at the active symbol positions. The total award display is updated to include the provided award and the free symbol generations remaining display is reduced by one to reflect the symbol generation. The gaming device further determines that none of the generated symbols are associated with any additional picks of the symbol positions. As no symbol generations remain, the game ends. Appropriate messages such as "YOUR AWARD FOR THIS GENERATION IS 500" and "GAME OVER" may be provided to the player visually, or through suitable audio or audiovisual displays.

In one alternative embodiment, one or more generated symbols are associated with one or more additional symbol generations. In this embodiment, if a symbol associated with an additional symbol generation is generated at one of the active symbol positions, the player is provided one or more additional symbol generations.

In another embodiment, one or more of the active symbol positions may not remain active during one or more subsequent symbol generations. In this embodiment, after a symbol position is active, the gaming device may randomly deactivate the active symbol position. In another embodiment, one or more of the inactive symbol positions may be randomly activated for one or more subsequent symbol generations. In another embodiment, the gaming device may rearrange the active symbol positions. In another embodiment, the gaming device may eliminate one or more previously active or inactive symbol positions from the symbol matrix. In an alternative embodiment, a symbol position may be active, fall inactive (or be deactivated) and then be activated again. In one embodiment, wherein at least one symbol position is initially active, if the player picks a symbol position which is initially active, such symbol position is deactivated. In one embodiment, the active symbol positions remain fixed and do not change locations in the symbol matrix. In another embodiment, the active symbol positions may change locations in the symbol matrix.

In an alternative embodiment, rather than determining each of the active symbol positions then generating symbols at each active symbol position as described above, the gaming device is operable to activate and generate symbols at different symbol positions one at a time. In this embodiment, the gaming device enables the player to pick a symbol position, activates the picked symbol position and generates a symbol at the activated symbol position. After generating a symbol at the activated symbol position, the gaming device enables the player to pick another symbol position, activates that picked symbol position and generates a symbol at that activated symbol position as described above. This process continues until the player picks a symbol position associated with a terminator, wherein an outcome is determined based on the generated symbols or symbol combinations.

In one embodiment, the present invention is employed as a primary game. In this embodiment, each time the symbol generators are activated (i.e., a symbol is generated at each of the active symbol positions), the player must place one or more separate wagers. In another embodiment, as described above, the present invention is employed as a secondary bonus game in a gaming device. In one embodiment, the present invention is employed in accordance with a plurality of free spins or generations of symbols at the active symbol positions. In this embodiment, upon a suitable triggering event, a number of free spins or activations of the currently active symbol positions are provided to the player. In one free spin mode or sequence embodiment, the gaming device automatically spins the reels for the player upon activation of the bonus game. However, in another embodiment, the player activates each spin of the reels.

It should be appreciated that while the present invention is described in regards to a slot game, the present invention can be implemented into any suitable type of game wherein an outcome is determined based on a plurality of generated symbols. In one embodiment illustrating a card game, a player is enabled to pick and activate playing card positions until the player picks a playing card position associated with a terminator. Upon the player picking a playing card position associated with a terminator, each of the activated playing card positions generate one or more playing cards and the player is provided an outcome based on the generated playing cards.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:
- a housing;
- at least one display device supported by the housing;
- a plurality of input devices supported by the housing, said plurality of input devices including:
  - (i) an acceptor, and
  - (ii) a cashout device;
- at least one processor; and
- at least one memory device which stores a plurality of instructions, which when executed by the at least one processor, cause the at least one processor to operate with the at least one display device and the plurality of input devices to:
  - (a) if a physical item is received via the acceptor, establish a credit balance based, at least in part, on a monetary value associated with the received physical item,
  - (b) for a play of a game after a placement of a wager:
    - (i) display a plurality of activated symbol display positions and a plurality of inactive symbol display positions,
    - (ii) upon an occurrence of an event:
      - (A) determine a quantity of inactive symbol display positions to activate,
      - (B) if the determined quantity of inactive symbol display positions to activate is at least one, activate each of the determined quantity of inactive symbol display positions, and
      - (C) if the determined quantity of inactive symbol display positions to activate is zero, activate none of the inactive symbol display positions,
    - (iii) for each of the activated symbol display positions and for each of the inactive symbol display positions:
      - (A) randomly determine a symbol from a plurality of different symbols, and
      - (B) display the randomly determined symbol at said symbol display position,
    - (iv) determine any awards associated with any winning symbol combinations formed from any of the symbols displayed at any of the activated symbol display positions, and
    - (v) display any determined awards associated with any winning symbol combinations formed from any of the symbols displayed at any of the activated symbol display positions, and
  - (c) if a cashout input is received via the cashout device, cause an initiation of any payout associated with the credit balance.

2. The gaming system of claim 1, wherein when executed by the at least one processor, the plurality of instructions cause the at least one processor to determine the quantity of inactive symbol display positions to activate based on at least one input made by a player.

3. The gaming system of claim 1, wherein the game includes a bonus game following a play of a wagering game played upon the placement of the wager.

4. The gaming system of claim 1, wherein the occurrence of the event is based, at least in part, on at least one of the randomly determined symbols displayed at at least one of the active symbol display positions.

5. The gaming system of claim 1, wherein at least one of the active symbol display positions and at least one of the inactive symbol display positions are each associated with one of a plurality of reels.

6. The gaming system of claim 1, wherein when executed by the at least one processor, the plurality of instructions cause the at least one processor to display the randomly determined symbols at each of the inactive symbol display position as partially grayed out.

7. A gaming system server comprising:
- at least one processor; and
- at least one memory device which stores a plurality of instructions, which when executed by the at least one processor, for a play of a game after receipt of data associated with a placement of a wager, cause the at least one processor to:
  - (a) cause at least one display device to display a plurality of activated symbol display positions and a plurality of inactive symbol display positions,
  - (b) upon an occurrence of an event:
    - (i) determine a quantity of inactive symbol display positions to activate,
    - (ii) if the determined quantity of inactive symbol display positions to activate is at least one, activate each of the determined quantity of inactive symbol display positions, and
    - (iii) if the determined quantity of inactive symbol display positions to activate is zero, activate none of the inactive symbol display positions,
  - (c) for each of the activated symbol display positions and for each of the inactive symbol display positions:
    - (i) randomly determine a symbol from a plurality of different symbols, and
    - (ii) cause the at least one display device to display the randomly determined symbol at said symbol display position,
  - (d) determine any awards associated with any winning symbol combinations formed from any of the symbols displayed at any of the activated symbol display positions, and
  - (e) cause at least one display device to display any determined awards associated with any winning symbol combinations formed from any of the symbols displayed at any of the activated symbol display positions, wherein any determined awards associated with any winning symbol combinations formed from any of the symbols displayed at any of the activated symbol display positions cause an increase of a credit balance which is increasable via an acceptor of a physical item associated with a monetary value, and which is decreasable via a cashout device.

8. The gaming system server of claim 7, wherein when executed by the at least one processor, the plurality of instructions cause the at least one processor to determine the quantity of inactive symbol display positions to activate based on at least one input made by a player.

9. The gaming system server of claim 7, wherein the game includes a bonus game following a play of a wagering game played upon the placement of the wager.

10. The gaming system server of claim 7, wherein the occurrence of the event is based, at least in part, on at least one of the randomly determined symbols displayed at at least one of the active symbol display positions.

11. The gaming system server of claim 7, wherein at least one of the active symbol display positions and at least one of the inactive symbol display positions are each associated with one of a plurality of reels.

12. The gaming system server of claim 7, wherein when executed by the at least one processor, the plurality of instructions cause the at least one processor to display the randomly determined symbols at each of the inactive symbol display position as partially grayed out.

13. A method of operating a gaming system for a play of a game after a placement of a wager, said method comprising:

(a) causing at least one display device to display a plurality of activated symbol display positions and a plurality of inactive symbol display positions, (b) upon an occurrence of an event:

(i) causing at least one processor to execute a plurality of instructions to determine a quantity of inactive symbol display positions to activate, (ii) if the determined quantity of inactive symbol display positions to activate is at least one, causing the at least one processor to execute the plurality of instructions to activate each of the determined quantity of inactive symbol display positions, and (iii) if the determined quantity of inactive symbol display positions to activate is zero, causing the at least one processor to execute the plurality of instructions to activate none of the inactive symbol display positions, (c) for each of the activated symbol display positions and for each of the inactive symbol display positions:

(i) causing the at least one processor to execute the plurality of instructions to randomly determine a symbol from a plurality of different symbols, and (ii) causing the at least one display device to display the randomly determined symbol at said symbol display position, (d) causing the at least one processor to execute the plurality of instructions to determine any awards associated with any winning symbol combinations formed from any of the symbols displayed at any of the activated symbol display positions, and (e) causing at least one display device to display any determined awards associated with any winning symbol combinations formed from any of the symbols displayed at any of the activated symbol display positions, wherein any determined awards associated with any winning symbol combinations formed from any of the symbols displayed at any of the activated symbol display positions cause an increase of a credit balance which is increasable via an acceptor of a physical item associated with a monetary value, and which is decreasable via a cashout device.

14. The method of claim 13, which includes causing the at least one processor to execute the plurality of instructions to determine the quantity of inactive symbol display positions to activate based on at least one input made by a player.

15. The method of claim 13, wherein the game includes a bonus game following a play of a wagering game played upon the placement of the wager.

16. The method of claim 13, wherein the occurrence of the event is based, at least in part, on at least one of the randomly determined symbols displayed at at least one of the active symbol display positions.

17. The method of claim 13, wherein at least one of the active symbol display positions and at least one of the inactive symbol display positions are each associated with one of a plurality of reels.

18. The method of claim 13, which includes causing the at least one display device to display the randomly determined symbols at each of the inactive symbol display position as partially grayed out.

19. The method of claim 13, which is provided through a data network.

20. The method of claim 19, wherein the data network is an internet.

* * * * *